United States Patent [19]

Konyn et al.

[11] Patent Number: 4,478,033
[45] Date of Patent: Oct. 23, 1984

[54] GARDENING TOOL

[76] Inventors: Dale R. Konyn; Wayne T. Zielke, both of 2929 Blue Jay Turn, Delray Beach, Fla. 33444

[21] Appl. No.: 567,412

[22] Filed: Dec. 30, 1983

[51] Int. Cl.³ .............................................. A01D 7/00
[52] U.S. Cl. .................................. 56/400.06; 172/375
[58] Field of Search ........... 56/400.06, 400.04, 400.05; 172/375; 111/92, 95

[56] References Cited

U.S. PATENT DOCUMENTS

| | | | |
|---|---|---|---|
| 665,871 | 1/1901 | Brooks . | |
| 1,167,491 | 1/1916 | Gilson, Sr. | 56/400.05 |
| 1,469,144 | 9/1923 | Harris | 56/400.06 |
| 2,497,506 | 2/1950 | McCaskill | 97/62 |
| 3,164,213 | 1/1965 | Lutz | 172/375 |
| 4,011,612 | 3/1977 | Atkinson | 172/375 |
| 4,212,150 | 7/1980 | Dmochowski | 56/400.06 |

FOREIGN PATENT DOCUMENTS 128874  7/1950  Sweden ............................. 172/375

Primary Examiner—Jay N. Eskovitz
Attorney, Agent, or Firm—Oltman and Flynn

[57] ABSTRACT

A gardening tool having a long straight handle with a rake head on one end and a hoe head on the opposite end. The rake head has tines which extend beyond the one end of the handle at an obtuse angle to the longitudinal axis of the handle and terminate in transverse teeth which are disposed completely on one side of the handle. The hoe head extends beyond its end of the handle at an obtuse angle to the longitudinal axis of the handle and it presents a flat blade located completely on one side of the handle. The rake head and the hoe head are offset from each other rotationally about the axis of the handle to prevent the hoe head from striking a person using the tool for raking and to prevent the rake head from striking the person using the tool as a hoe.

7 Claims, 9 Drawing Figures

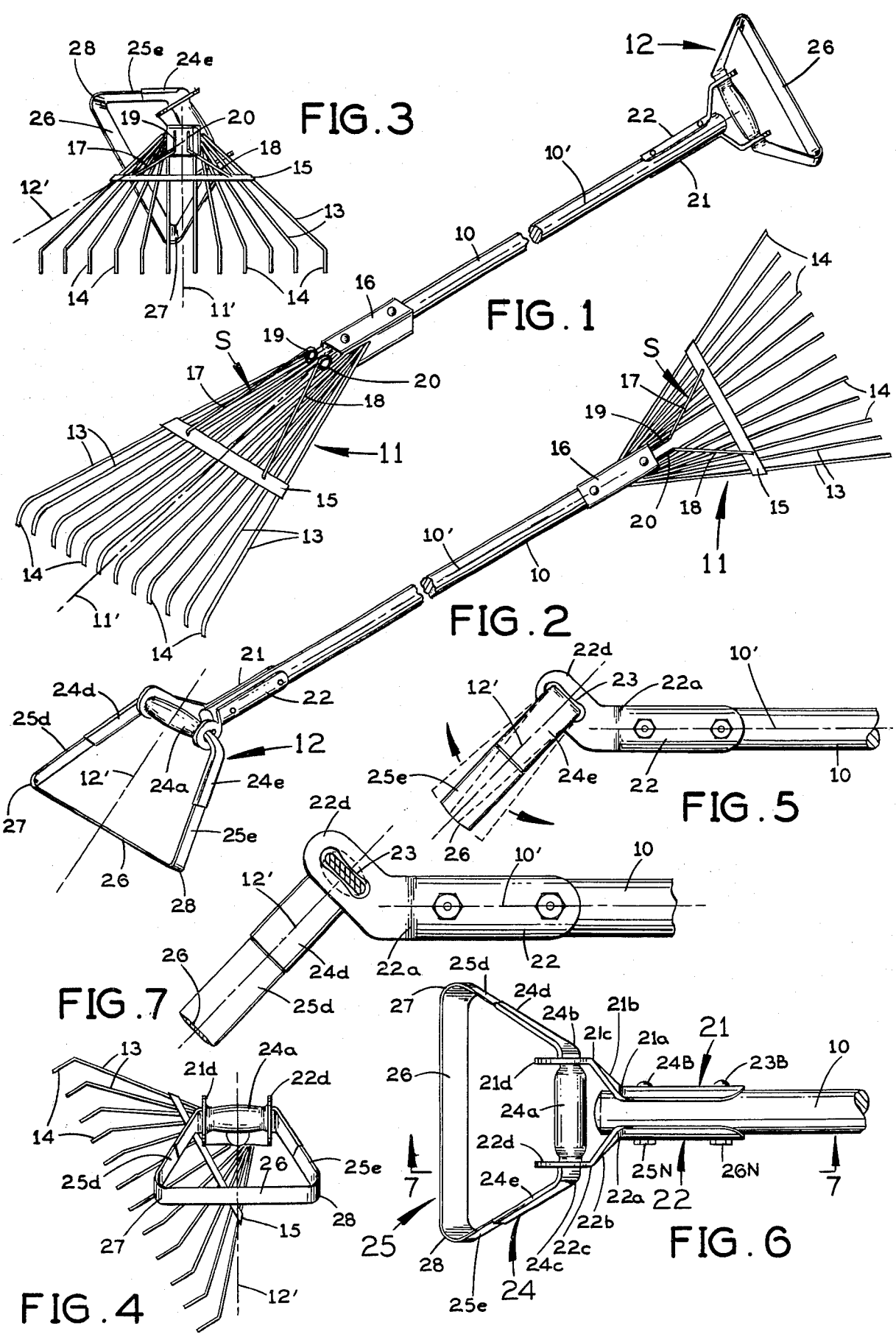

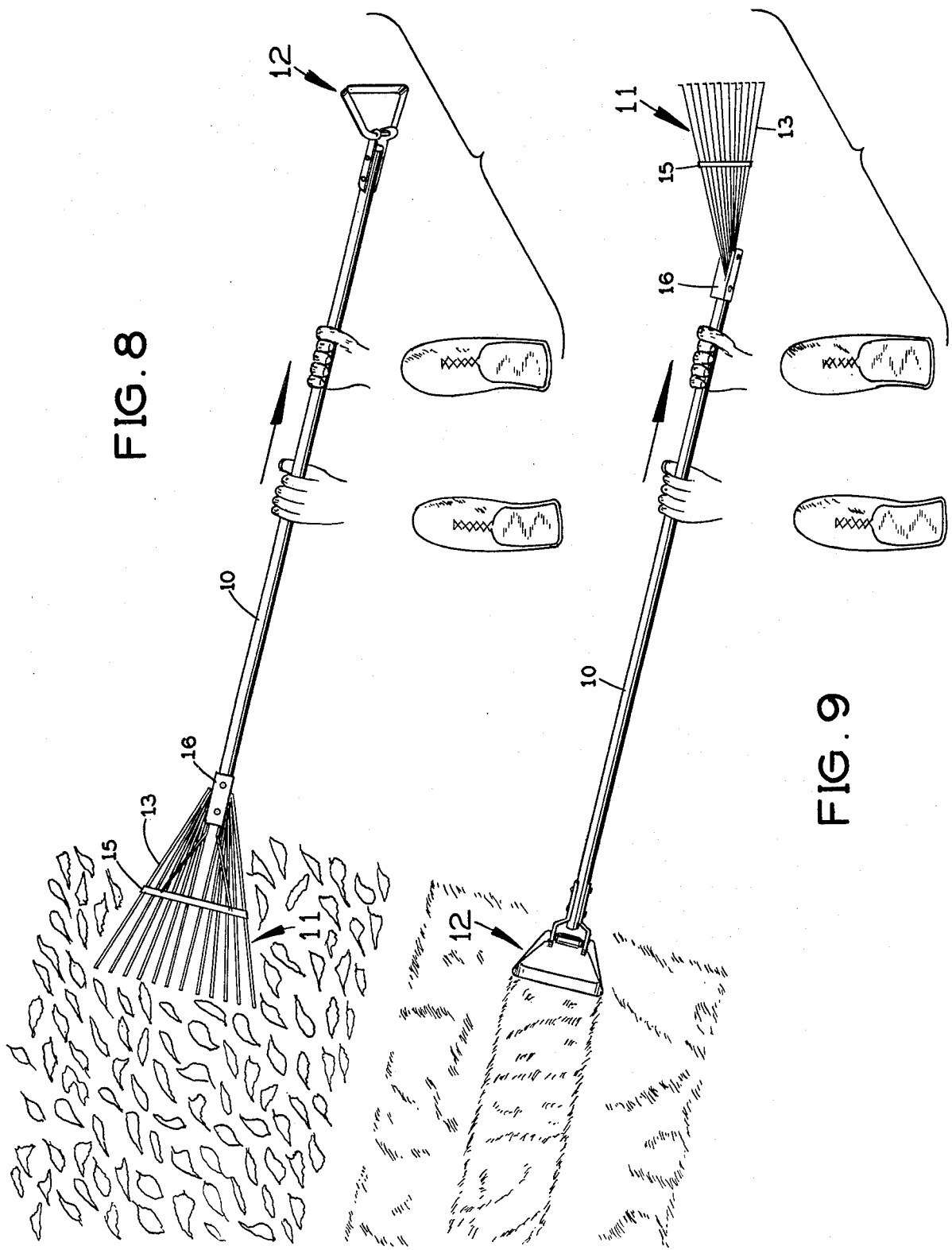

4,478,033

GARDENING TOOL

SUMMARY OF THE INVENTION

This invention relates to a gardening tool which may be used as a rake and as a hoe.

A gardening tool is accordance with this invention has an elongated handle with a rake head on one end and a hoe head on the opposite end. The rake head and the hoe head extend angularly from the handle in such a manner that when the tool is used as a rake the hoe head on the upper end of the handle will not strike the person using the tool, and when the tool is used as a hoe the rake head on the upper end of the handle will not strike the person.

A principal object of this invention is to provide a novel gardening tool which can be used conveniently as a rake and as a hoe, enabling the user to change quickly from raking to hoeing or vice versa.

Further objects and advantages of this invention will be apparent from the following detailed description of a presently preferred embodiment which is illustrated schematically in the accompanying drawings.

DESCRIPTION OF THE DRAWINGS

FIG. 1 is a perspective view of the present gardening tool with the rake end down;

FIG. 2 is a similar view with the hoe end down;

FIG. 3 is an end elevation taken from the rake end of the tool;

FIG. 4 is an end elevation taken from the hoe end of the tool;

FIG. 5 is a side elevation showing the limited rocking movement of the hoe head with respect to the handle of the tool;

FIG. 6 is a fragmentary top plan view of the hoe end of the tool;

FIG. 7 is a longitudinal section taken along the line 7—7 in FIG. 6;

FIG. 8 is a view looking down on the present gardening tool and showing the feet and hands of a person using it as a rake; and FIG. 9 is a view similar to FIG. 8 and showing the tool used as a hoe.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Referring to FIG. 1, in broad outline the present gardening tool comprises an elongated straight handle 10 of circular cross-section, a rake head 11 on one end of the handle, and a hoe head 12 on the opposite end of the handle.

The rake head comprises a plurality of resilient and somewhat flexible metal tines 13 arranged in a fan-like pattern. The tines are gathered together at one end, where they are attached to the handle 10, and from this end they diverge laterally as they extend longitudinally beyond this end of the handle. At the wider end of the rake head (away from handle 10) each tine terminates in a transversely bent tooth 14.

A substantially rigid cross bar 15 engages the rake tines 13 about midway along their length. A holder 16 of known design receives and rigidly supports the tines 13 at the narrow end of the rake head. This holder also receives and is clamped to the end of handle 10.

A torsion spring S is affixed in holder 16 and presents opposite legs 17 and 18, the ends of which are anchored to the cross bar 15 at widely spaced locations. The legs of spring S have respective spirally wound segments 19 and 20 located just beyond the holder 16. Spring S provides a relatively stiff but resilient support for the cross bar 15 which permits the rake tines 13 to flex in use but prevents them from being permanently deformed as a result of such flexing.

Except at their bent teeth 14, the tines 13 of the rake head beyond the end of handle 10 lie in a common plane which extends at an obtuse angle (e.g. 165 degrees) to the longitudinal axis of handle 10. As shown in FIG. 3, the transverse teeth 14 on the free ends of the tines are located completely on one side of the handle, and as shown in FIGS. 3 and 4, the free ends of these teeth lie in a common plane. The tines 13 of the rake head are on this same side of the handle except near the holder 16 which mounts them on the opposite side of the handle. As shown in FIG. 1, the rake head 11 is symmetrical on opposite sides of its longitudinal axis 11', which lies in the plane which extends at about 165 degrees to the handle's longitudinal axis 10'.

At the opposite end of handle 10 the hoe head 12 is carried by a pair of holder pieces 21 and 22 (FIG. 6) which are mirror images of one another. Each has an elongated segment of arcuate cross-section which snugly engages the handle 12. These arcuate segments are located diametrically opposite one another and they are fastened to the handle by bolts B passing through the handle and corresponding nuts N. The holder pieces are bent outward from the handle at 21a and 22a (FIG. 6) and beyond these bends they present laterally outwardly inclined segments 21b and 22b. The outer ends of segments 21b and 22b are bent at 21c and 22c, and from here the holder pieces present flat parallel outer end segments 21d and 22d, located beyond this end of handle 10 and on diametrically opposite sides of the handle.

As shown in FIG. 5 for the holder piece 22, the outer end segment 22d extends at an angle of about 45 degrees to the axis of handle 10. This is also true of the outer end segment 21d of the other holder piece 21. The outer end segment 22d of holder piece 22 is formed with an inclined slot 23 which is somewhat FIG. 8 shaped, with rounded opposite ends which are slightly larger than the middle part which connects them. The outer end segment 21d of the other holder piece 21 has an identical slot aligned with a slot 23.

The hoe head 12 of two-piece construction, with a bifurcated inner end piece 24 and a bifurcated outer end piece 25 attached to the inner end piece. The inner end piece 24 has a cross piece with a tubular mid-section 24a (FIGS. 2 and 6) located between the outer end segments 21d and 22d of the holder pieces 21 and 22. At each end of this tubular mid-section the inner end cross piece is flattened to pass through the slot in the respective holder piece. Laterally beyond the holder pieces the inner end piece 24 is bent at 24b and 24c and beyond these bends it presents diverging, flat, opposite legs 24d and 24e. The outer end piece 25 of the hoe head presents opposite legs 25d and 25e which are joined to the legs 24d and 34e, respectively, of the inner end piece and extend as straight continuations of them. Legs 25d and 25e are joined to a transverse flat blade 26 at rounded corners 27 and 28.

As shown in dashed lines in FIG. 5, the inner end piece 24 of the hoe head has enough clearance in the slots of the mounting pieces 21 and 22 that the hoe head can rock pivotally a limited amount with respect to these mounting pieces and handle 10. The founded midsection 24a on the inner end of the hoe head prevents it from sliding laterally of the handle 10.

Referring to FIG. 2, the hoe head 12 is symmetrical on opposite sides of its longitudinal axis 12' which, as shown in FIGS. 5 and 7, extends away from the adjacent end of handle 10 at an angle of about 135 degrees to the handle's longitudinal axis 10'. The axis 12' of the hoe head is offset from the axis 11' of the rake head rotationally about the handle axis 10' about 45 degrees as shown in FIGS. 3 and 4.

The hoe blade 26 is positioned completely on one side of the handle 10 and both sides 24d, 25e and 24e, 25e of the hoe head are on this same side of the handle for almost their entire length.

Because of the angular offset between the rake head 11 and the hoe head 12 rotationally about the axis of handle 10, the plane of the free ends of the rake teeth 14 is at an angle of about 150 degrees to the plane of the hoe blade 26, as shown in FIG. 3.

FIG. 8 shows this gardening tool being used as a rake. The user will hold the handle at an acute angle to the ground to position the rake teeth 14 on the ground. Usually, a right-handed person will position the rake head to the left of his body and slightly ahead of his or her feet and in raking the ground will pull the rake toward the feet, as indicated by the arrow in FIG. 8. In this position of the gardening tool the hoe head 12 will be substantially completely on the opposite side of the handle 10 from the body of the person using the tool. The hoe head extends downward at an angle of about 30 degrees to the horizontal, as well as away from the person's body. Consequently, there is virtually no possibility of the hoe head striking the person as he or she moves the handle 10 back and forth to rake the ground.

Likewise, as shown in FIG. 9, when the person uses the gardening tool as a hoe, the rake head 11 extends away from the person's body so that there is virtually no chance that it will strike the person while he or she is moving the handle 10 back and forth.

For a left-handed person, the angular offset of the hoe head with respect to the rake head about the axis of handle 10 should be reversed from the arrangement shown in the drawings so that the hoe head will extend away from the person during raking and the rake head will extend away from the person during hoeing.

We claim:

1. A gardening tool comprising:
   an elongated straight handle having a longitudinal axis;
   a rake head attached to one end of said handle, said rake head having a plurality of elongated tines extending longitudinally beyond said one end of the handle at a first obtuse angle to said longitudinal axis of the handle, said tines terminating away from the handle in transverse teeth which are located completely on one side of the handle, said rake head being substantially symmetrical on opposite sides of a longitudinal axis extending at said first obtuse angle to the longitudinal axis of the handle;
   and a hoe head operatively connected to the opposite end of said handle and extending longitudinally beyond said opposite end of the handle at a second obtuse angle to said longitudinal axis of the handle, said hoe head being substantially symmetrical about a longitudinal axis extending at said second obtuse angle to the longitudinal axis of the handle, said hoe head away from the handle presenting a blade extending laterally on opposite sides of its longitudinal axis and positioned completely on one side of the handle;
   said axes of the rake head and the hoe head being offset from each other rotationally about the longitudinal axis of the handle by an acute angle substantially greater than zero and substantially less than 90 degrees whereby (a) to position substantially the entire hoe head on the opposite side of the handle from the body of a person holding the handle with the rake head teeth in raking position on the ground at one side of the person, and (b) to position the rake head teeth on the opposite side of the handle from the body of a person holding the handle with the hoe head blade in hoeing position on the ground at said one side of the person.

2. A gardening tool according to claim 1, wherein:
   said hoe head has a pair of opposite legs extending from opposite ends of said blade toward the handle and a cross piece extending transversely between said legs at the opposite end of the latter from said blade;
   and further comprising:
   holder pieces for the hoe head fastened to said handle at said opposite end of the latter and receiving said cross piece on the hoe head to connect the hoe head operatively to the handle.

3. A gardening tool according to claim 1, wherein:
   said teeth on the rake head have free ends lying substantially in a common plane;
   and said blade on the hoe head extends substantially in a plane at an obtuse angle to the plane of the free ends of the rake teeth.

4. A gardening tool according to claim 1, wherein said rake head and said hoe head are offset from each other substantially 45 degrees rotationally about the handle.

5. A gardening tool according to claim 4, wherein:
   said teeth on the rake head have free ends lying substantially in a common plane;
   and said blade on the hoe head extends substantially in a plane at an obtuse angle to the plane of the free ends of the rake teeth;
   and said hoe head has a pair of opposite legs extending from opposite ends of said blade toward the handle and a cross piece extending transversely between said legs at the opposite end of the latter from said blade;
   and further comprising:
   holder pieces for the hoe head fastened to said handle at said opposite end of the latter and receiving said cross piece on the hoe head to connect the hoe head operatively to the handle.

6. A gardening tool comprising:
   an elongated handle;
   a rake head attached to one end of said handle, said rake head having a plurality of elongated tines extending longitudinally beyond said one end of the handle, said tines terminating away from the handle in transverse teeth which are located completely on one side of the handle;

and a hoe head operatively connected to the opposite end of said handle and extending longitudinally beyond said opposite end of the handle, said hoe head away from the handle presenting a blade positioned completely on one side of the handle;

said rake head and said hoe head being offset from each other rotationally about the handle by an acute angle substantially greater than zero and substantially less than 90 degrees whereby (a) to position substantially the entire hoe head on the opposite side of the handle from the body of a person holding the handle with the rake head teeth in raking position on the ground at one side of the person, and (b) to position the rake head teeth on the opposite side of the handle from the body of a person holding the handle with the hoe head blade in hoeing position on the ground at said one side of the person.

7. A gardening tool according to claim 6, wherein said rake head and said hoe head are offset from each other substantially 45 degrees rotationally about the handle.

* * * * *